US006796471B2

United States Patent
Aftanas et al.

(10) Patent No.: US 6,796,471 B2
(45) Date of Patent: Sep. 28, 2004

(54) VEHICLE ARTICLE CARRIER HAVING A SIMPLIFIED LOCKING MECHANISM

(75) Inventors: Jeffrey M. Aftanas, Ortonville, MI (US); Gerard J. Kmita, Allen Park, MI (US)

(73) Assignee: Jac Products, Inc., Saline, MI (US)

( * ) Notice: Subject to any disclaimer, the term of this patent is extended or adjusted under 35 U.S.C. 154(b) by 66 days.

(21) Appl. No.: 10/277,594

(22) Filed: Oct. 22, 2002

(65) Prior Publication Data

US 2004/0074939 A1 Apr. 22, 2004

(51) Int. Cl.[7] .................................................. B60R 9/00
(52) U.S. Cl. ...................................... 224/321; 224/326
(58) Field of Search ................................ 224/315, 321, 224/322, 323, 326; 280/762, 769; 403/322.4

(56) References Cited

U.S. PATENT DOCUMENTS

| | | |
|---|---|---|
| 4,972,983 A | 11/1990 | Bott |
| 4,982,886 A | 1/1991 | Cucheran |
| 5,082,158 A | 1/1992 | Bott |
| 5,104,019 A | 4/1992 | Bott |
| 5,133,490 A | 7/1992 | Cucheran |
| 5,143,267 A | 9/1992 | Cucheran et al. |
| 5,174,484 A | 12/1992 | Bott |
| 5,207,365 A | 5/1993 | Bott |
| 5,366,128 A * | 11/1994 | Grim ............................ 224/322 |
| 5,385,285 A | 1/1995 | Cucheran et al. |
| 5,419,479 A * | 5/1995 | Evels et al. .................. 224/322 |
| 5,492,258 A * | 2/1996 | Brunner ....................... 224/315 |
| 5,588,572 A | 12/1996 | Cronce et al. |
| 5,791,536 A * | 8/1998 | Stapleton ..................... 224/321 |
| 6,010,048 A * | 1/2000 | Settelmayer ................. 224/315 |
| 6,050,467 A * | 4/2000 | Drouillard et al. ........... 224/321 |
| 6,102,265 A * | 8/2000 | Stapleton ..................... 224/321 |
| 6,112,965 A * | 9/2000 | Lundgren ..................... 224/322 |

* cited by examiner

Primary Examiner—Gary E. Elkins
(74) Attorney, Agent, or Firm—Harness, Dickey & Pierce, P.L.C.

(57) ABSTRACT

A vehicle article carrier apparatus having bracket assemblies that include a locking mechanism requiring no independent springs or biasing elements. The bracket assemblies are secured to opposite ends of a cross bar member and each of the bracket assemblies are coupled to a respective support rail secured to an outer body surface of a vehicle. Each bracket assembly generally includes an actuating lever and a locking clamp that are each pivotable between closed and open positions. When the actuating lever is placed in the closed position, interaction between the actuating lever and the locking clamp forces the locking clamp closed and maintains the locking clamp in the closed position. When the actuating lever is moved from the closed position to the open position, the interaction between the actuating lever and the locking clamp permits the locking clamp to open and disengage the support rail.

20 Claims, 3 Drawing Sheets

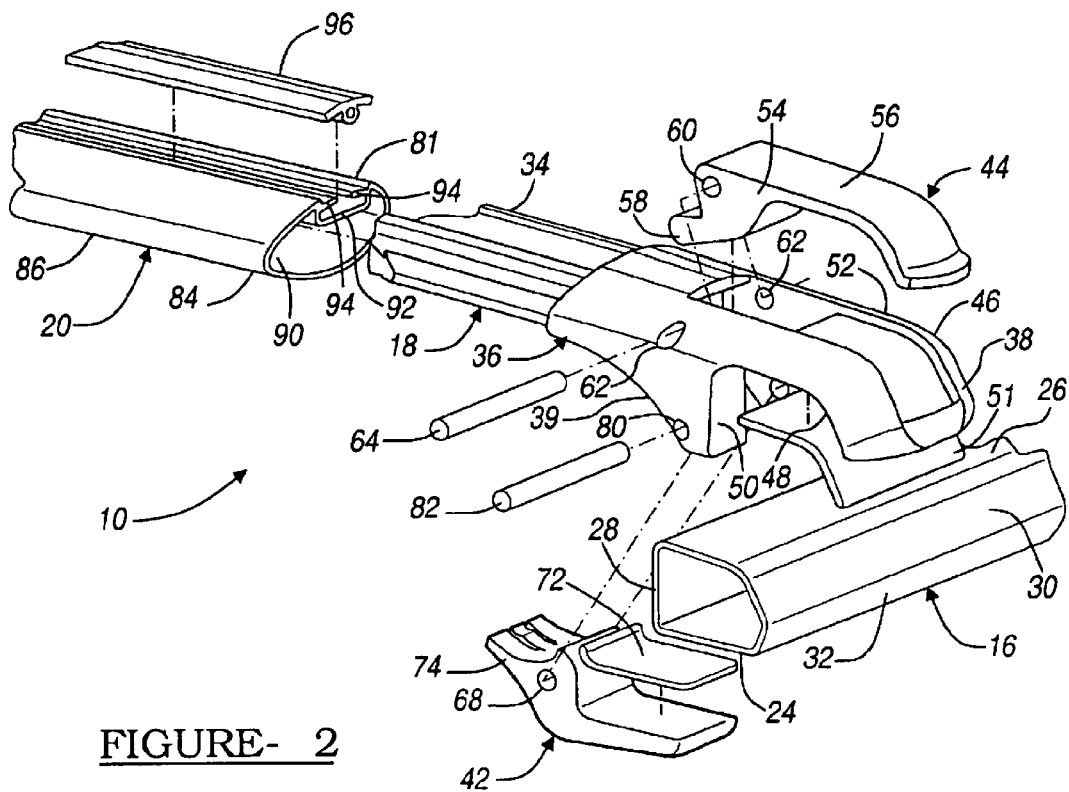
FIGURE- 2
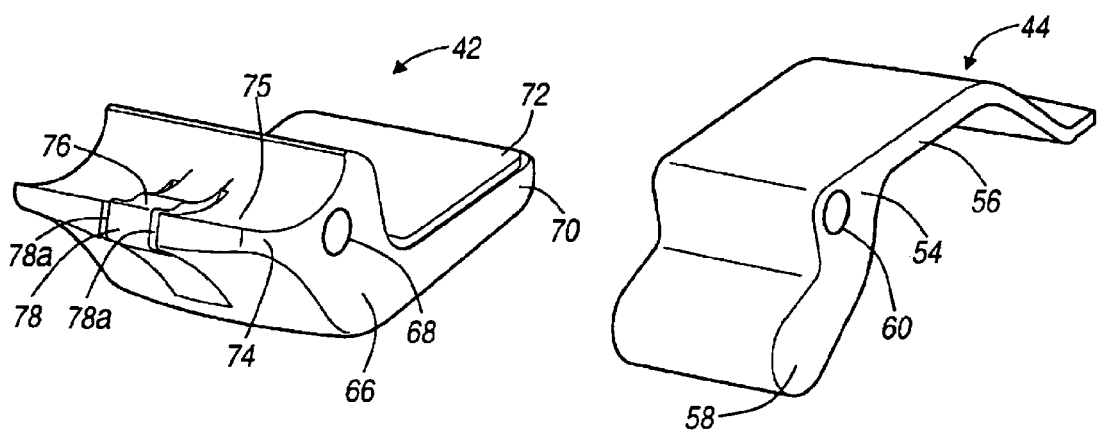
FIGURE- 3
FIGURE- 4

VEHICLE ARTICLE CARRIER HAVING A SIMPLIFIED LOCKING MECHANISM

FIELD OF THE INVENTION

The present invention generally relates to vehicle article carriers. More particularly, the present invention relates to a vehicle article carrier having a bracket assembly with a simplified and improved locking mechanism.

BACKGROUND OF THE INVENTION

Vehicle article carriers are used in a wide variety of applications for supporting and securing articles of various sizes above an outer surface of a vehicle. Typically, vehicle article carriers include a pair of support rails that are secured to the outer body surface of the vehicle. The support rails are typically straight and mounted on the outer body surface to extend parallel to each other. The support rails are usually secured along a major longitudinal length of the vehicle roof, rear deck lid, or truck bed.

Typically, at least one cross bar extends between the two support rails. The cross bar is secured to each support rail by bracket assemblies that are releasably fastened to each end of the cross bar. Each bracket assembly typically comprises a locking mechanism for releasably securing it to an associated one of the opposing support rails.

While current vehicle article racks perform adequately for their intended use they are all subject to improvement. Specifically, the locking mechanisms of many current article racks typically include a relatively large number of complex parts, thus making the locking mechanisms somewhat difficult and/or costly to assemble. Many such locking mechanisms require one or more independent springs to perform the needed locking action, which can add to the complexity and cost of the locking mechanism. Further, with some article carriers, the locking mechanisms can fail to completely disengage the support rail when opened to thereby prevent the bracket assembly from being easily repositioned along its associated support rail or removed from the support rail.

Consequently, there exists a need for a vehicle article carrier having a cross bar with bracket assemblies at each end thereof that include a simplified locking mechanism that is easier to assemble, more cost efficient to produce, and that provides excellent reliability in its locking orientation.

SUMMARY OF THE INVENTION

The present invention overcomes the deficiencies of the prior art by providing a vehicle article carrier apparatus having bracket assemblies that can be constructed with a reduced parts count. The bracket assemblies operate as locking mechanisms and are secured to opposite ends of a cross bar member. Each of the bracket assemblies are coupled to support rails of a vehicle to suspend the cross bar between the support rails.

Each bracket assembly generally includes an actuating member pivotable between a closed position and an open position, and a locking member pivotable between a closed position and an open position. When the actuating member is placed in the closed position, interaction between the actuating member and the locking member forces the locking member closed and maintains the locking member in the closed position to secure the bracket assembly to the support rail. When the actuating member is moved rotationally from the closed position to the open position, the interaction between the actuating member and the locking member causes the locking member to move rotationally to the open position to be unclamped from the support rail. When placed in the open position, the locking clamp opens such that the bracket assembly may be lifted directly from the support rail without having to jostle or slide the bracket assembly from the support rail. Alternatively, the bracket assembly may be adjustably positioned along its respective support rail. The above described locking and unlocking action is accomplished without the use of any internal springs or biasing elements in the bracket assemblies.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is an exploded perspective view of a portion of a cross bar, a portion of a support rail, and a bracket assembly of the apparatus of FIG. 1;

FIG. 3 is a perspective view of a lower locking clamp of the bracket assembly of FIG. 2;

FIG. 4 is perspective view of an actuating lever of the bracket assembly of FIG. 2;

DETAILED DESCRIPTION OF THE PREFERRED EMBODIMENTS

The following description of the preferred embodiments is merely exemplary in nature and is in no way intended to limit the invention, its application, or uses.

Figure 1:
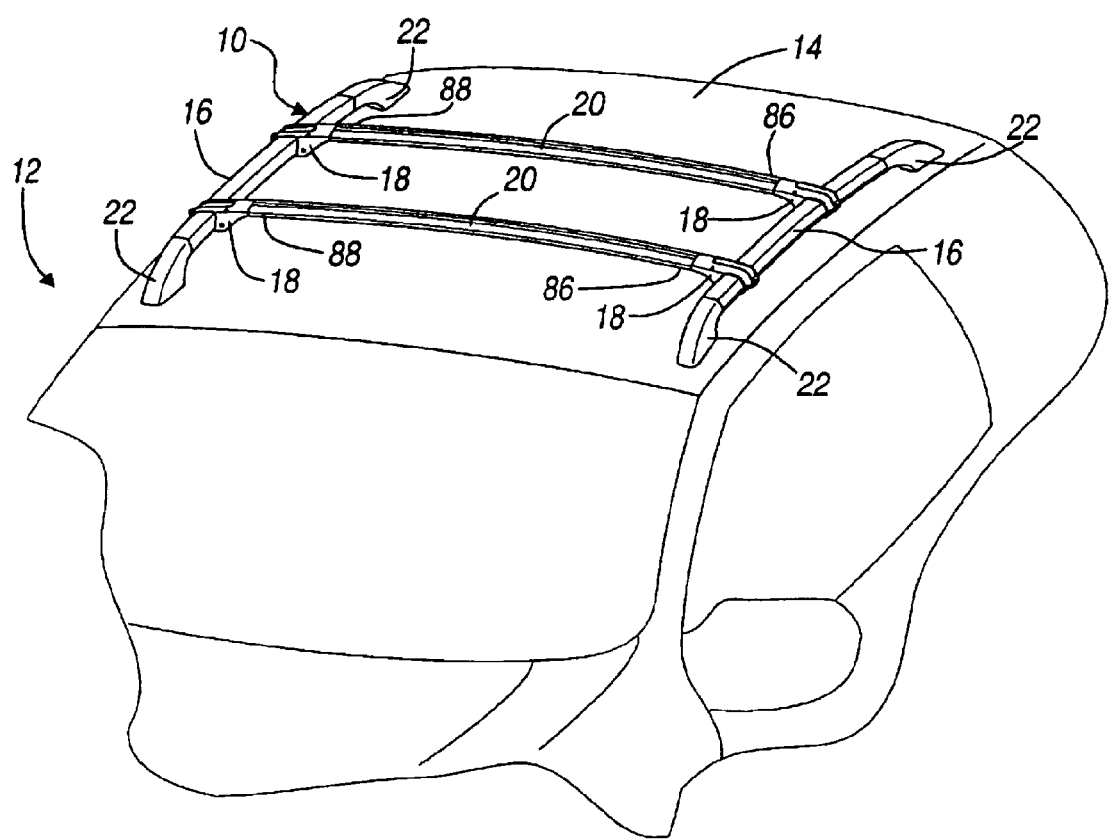
FIG. 1 is a perspective view of a portion of a vehicle including a vehicle article carrier apparatus in accordance with a preferred embodiment of the present invention.

Referring to FIG. 1, a vehicle article carrier apparatus 10 in accordance with a preferred embodiment of the present invention is illustrated. The article carrier apparatus 10 is shown installed on an exemplary motor vehicle 12. Specifically, the apparatus 12 is shown installed on a roof portion 14 of the motor vehicle 12. While FIG. 1 shows the apparatus 10 secured to the roof portion 14, it will be appreciated that the apparatus 10 can just as readily be secured at various other surfaces about the exterior of the motor vehicle 12. Further, the apparatus 10 is suitable for use on virtually any form of vehicle such as a sport utility vehicle, station wagon, sedan, etc.

The apparatus 10 generally includes a pair of elongated support rails 16, at least two cross bar bracket assemblies 18, and at least one cross bar 20. It will be appreciated that in many applications two adjustably positionable cross bars 20 will be used, but that one of the cross bars 20 could just as readily comprise a fixed (i.e., non-movable) cross bar member. For the purpose of discussion and illustration, both of the cross bars 20 comprise adjustable cross bars.

As illustrated in FIG. 1, support rails 16 are placed in a generally parallel relationship along opposite sides of roof 14. The support rails 16 supported above the roof portion 14 by suitable support feet 22. FIG. 2 provides a more detailed view of one of the support rails 16, as well as cross bar 20 and one of the bracket assemblies 18. As seen in FIG. 2, support rail 16 is generally comprised of a lower surface 24, an upper surface 26, an inner surface 28, an upper outer surface 30, and a lower outer surface 32.

With further reference to FIG. 2, the cross bar bracket assembly 18 will now be described in detail. The bracket assembly 18 generally includes a cross bar connection neck or region 34 extending from a housing 36. The neck 34 is sized to be telescopically inserted into the cross bar 20. The interaction between the neck 34 and the cross bar 20 is described in further detail below.

The housing 36 includes an upper clamp portion 38 and a lower support portion 39. The housing 36 is used to support a lower locking clamp 42 and an actuating lever 44. Upper clamp portion 38 has an upper surface 46, a lower surface 48, and an inner surface 50. The shape of upper surface 46, lower surface 48, and inner surface 50 complements the shape of the inner surface 28, upper surface 26, and outer upper surface 30 of support rail 16 so that the upper clamp portion 38 may sit firmly over the support rail 16. To cushion the interaction between upper clamp portion 38 and support rail 16, a rubber or other like pad 51 may be secured to lower surface 48 by adhesives or other suitable means.

Referring to FIG. 2, within the upper surface 46 of the upper clamp portion 38 is a hollowed out area 52. Seated within the hollowed out area 52 is the actuating lever 44. The actuating lever 44 is comprised of a base portion 54 with handle 56 and a lip or flange 58 extending from the base portion 54. Extending through the base portion 54 is a through hole 60. The actuating lever 44 is secured within the hollowed out area 52 by a suitable fastening device that allows the lever 44 to pivot relative to the housing 36. As illustrated, through hole 60 is aligned with a similar through hole 62 located within the housing 36 and secured into place by a retaining pin 64 that is threaded or press fit through the through holes 60, 62.

Referring to FIG. 3, the lower locking clamp 42 will now be described in detail. The locking clamp 42 is generally comprised of a center portion 66 having an aperture 68. Extending from the center portion 66 is a clamp portion 70. Clamp portion 70 is shaped to complement the lower surface 24 of the support rails 16 and abuts lower surface 24 when the locking clamp 42 is in a closed position with the bracket assembly 18 positioned on a respective one of the support rails 16. A pad 72 may be secured to the clamp 70 to provide a surface to cushion the interaction between the clamp 70 and the support rail 16.

Extending from center portion 66 opposite clamp 70 is a tab 74. The tab 74 is curved upward toward upper clamp 38. The tab 74 includes a raised portion 76 extending from a flap 78 formed within the tab 74 by a pair of cuts or notches 78a. The flap 78 is slightly flexible and extends above the surface of the tab 74. A slightly arcuate surface 75 is also formed on the tab 74. An edge surface 76a borders the raised portion 76. The raised portion 76 provides a tactile "feel" to an individual during the locking and unlocking process, as will be explained more fully in connection with FIGS. 5A–5C.

The locking clamp 42 is seated within main housing 36 so that aperture 68 is aligned with an aperture 80 of the main housing. Once aperture 68 and aperture 80 are aligned, a threaded or press fit pivot pin 82 is inserted through the apertures 68, 80 to pivotally connect the locking clamp 42 to the main housing 36.

With reference to FIGS. 1 and 2, the cross bar 20 will now be described in detail. The cross bar 20 is generally comprised of an elongated tubular, oval shaped (in cross-section) member having a top portion 81, a bottom portion 84, a first outer most end 86, a second outer most end 88 (FIG. 1) and an inner region 90. As seen in FIG. 2, the top portion 81 has a channel 92 that extends the length thereof. The channel 92 is bordered by recessed flanges 94. A majority of the channel 92 is covered by a rubber bumper 96. The rubber bumper 96 is seated on the recessed flanges 94.

Inner region 90 receives the cross bar neck 34 at first outer most end 86. The bracket assembly 18 at the second outer most end 88 is secured to the cross bar 20 in the same fashion. The neck 34 is secured within inner region 90 in any conventional manner, such as by threaded fasteners (not shown) to provide a rigid connection between the cross bar 20 and the cross bar bracket assemblies 18.

Figure 5A:
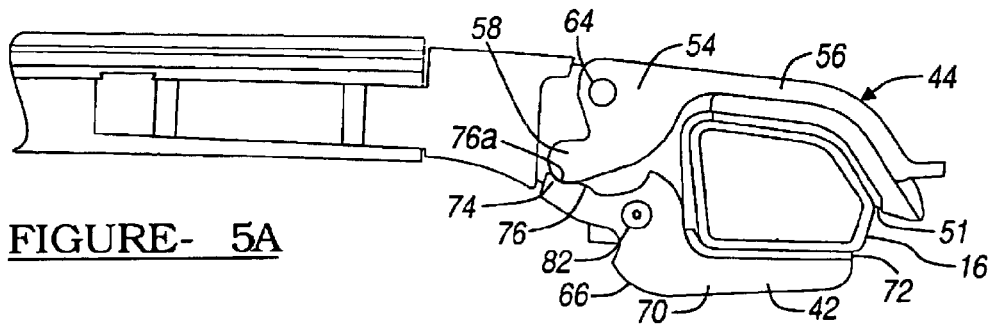
FIG. 5A is a partial cross sectional view of a portion of a cross bar and a bracket assembly of FIG. 1, the bracket assembly illustrated in a closed position and secured to a support rail of FIG. 1.
Figure 5B:
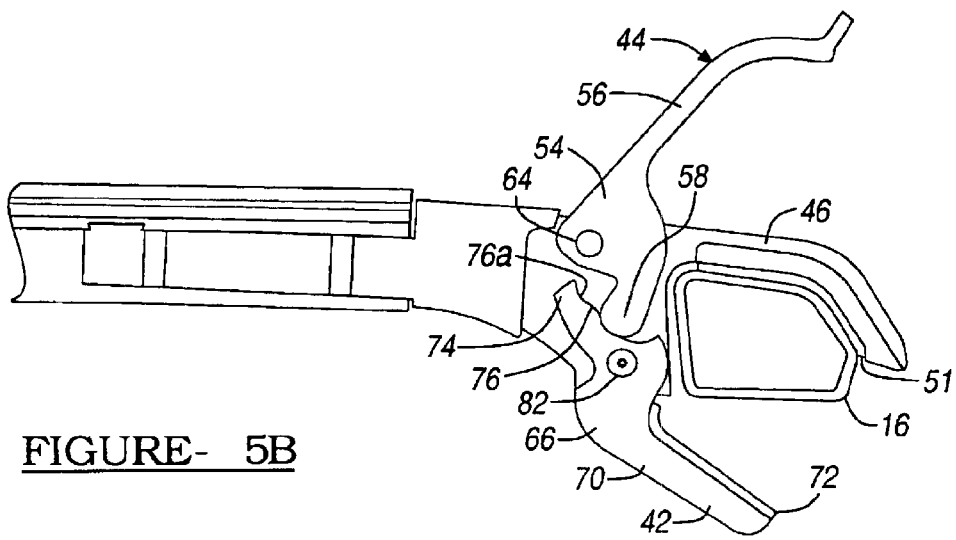
FIG. 5B is a partial cross sectional view of a portion of a cross bar and a bracket assembly of FIG. 1, the bracket assembly illustrated in an intermediate open position.
Figure 5C:
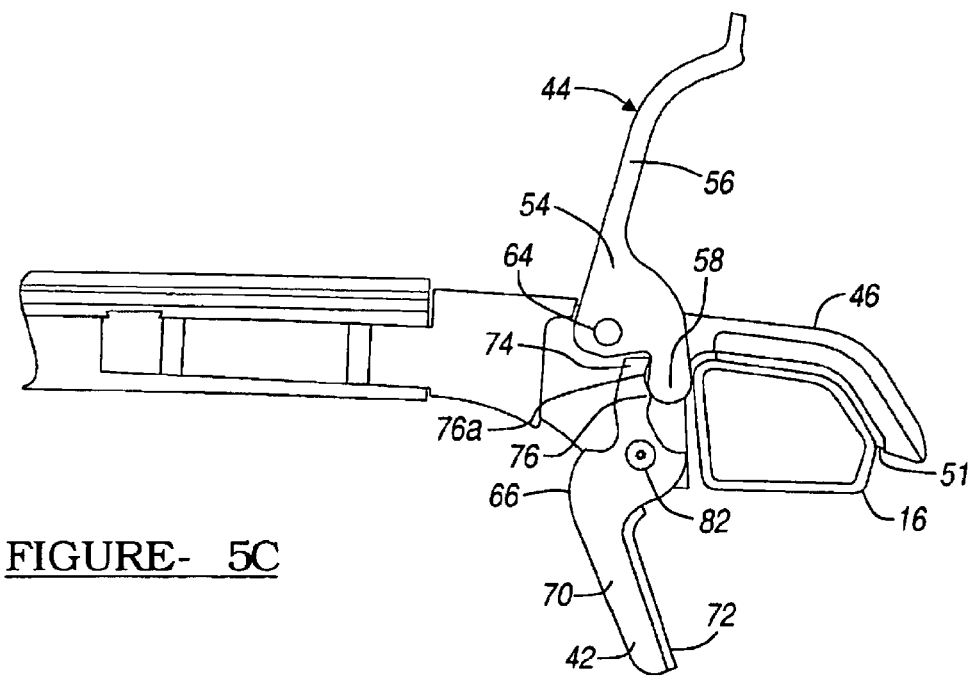
FIG. 5C is a partial cross sectional view of the bracket assembly of FIG. 5B illustrated in a completely open position to allow the bracket assembly to be vertically lifted from the support rail of FIG. 1.

FIG. 5A illustrates the components of FIG. 2 as installed. As seen in FIG. 5A, the lower locking clamp 42 and actuating lever 44 are in contact with each other when installed within bracket assembly 18. Specifically, FIG. 5A illustrates the bracket assembly 18 in the locked position with the flange 58 of actuating lever 44 in contact with edge surface 76a of the tab 74. In the locked position of FIG. 5A, the locking clamp 42 cannot pivot outward and away from actuating lever 44, as seen in FIG. 5B and FIG. 5C. This is in part because of the arrangement of the pivot pins 64 and 82. Any force that tends to pull the lower locking clamp 42 away from the lower surface 24 of the support rail 16 (i.e., a downwardly directed force in the drawing of FIG. 5A) will be resisted by the counteracting force applied by the flange 58 to the tab 74 of the actuation lever 44, and will actually cause the actuator lever 44 to bear down even tighter on the support rail 16. Thus, when the actuating lever 44 is placed in the locked position, the bracket assembly 18 will be securely fastened to support rail 16.

For actuating lever 44 to move out of the locked position of FIG. 5A, a lifting force must be applied to the actuating lever 44 to cause flange 58 to clear raised portion 76. Thus, the presence of raised portion 76 prevents the bracket assembly 18 from arbitrarily opening during use of the article carrier 10 and provides a tactile signal to the individual that the actuating lever 44 has moved between the locked and unlocked positions.

Referring to FIG. 5B, to permit the locking clamp 42 to rotate outward, the handle 56 of actuating lever 44 must be moved from the locked position of FIG. 5A to either an intermediate open position (FIG. 5B) or a fully open position (FIG. 5C). In both the intermediate open position (FIG. 5B) and the fully open position (FIG. 5C), the actuating lever 56 is rotated out from the housing 36. This causes the flange 58 to be rotated counterclockwise in the drawing of FIG. 5B. As actuator lever 56 is rotated counterclockwise, the flange 58 moves over raised portion 76, which allows the entire locking clamp 42 to be rotated clockwise about pivot pin 82 in the drawings of FIG. 5B. In effect, the location of the pivot pin 82 being offset toward the tab 74 and the weight of the clamp portion 70 facilitates this clockwise rotational movement. Accordingly, no independent springs or biasing members are required to maintain the locking clamp 42 in a locked position.

Referring to FIGS. 5B and 5C, once flange 58 passes over raised portion 76, the flange 58 moves into contact with the arcuate portion 75 of the tab 74 (FIG. 5B). Further rotation of the actuating lever 44 in the counterclockwise direction allows continued rotation of the locking clamp 42 in the clockwise direction about pin 82, as shown in FIG. 5B. At this point, the bracket assembly 18 can be easily moved along the support rail 16.

When the actuating lever 44 is rotated to the fully open position illustrated in FIG. 5C, flange 58 is disposed essentially vertically, thus allowing the locking clamp 42 to fully open so that the clamp 70 portion extends from housing 36 at nearly a ninety degree angle. Thus, when the locking clamp 42 is fully open, as illustrated in FIG. 5C, the bracket assemblies 18 and associated cross bar 20 may be vertically lifted from engagement with the support rails 16 without any need for additional rotating, pivoting, or jostling of the bracket assemblies 18. Advantageously, no independent biasing element (i.e., spring) is required to hold the locking clamp 42 in the fully unlocked position shown in FIG. 5C.

The locking of bracket assemblies 18 to the support rails 16 will now be described in detail. The steps involved in locking the bracket assemblies 18 to the support rails 16 are the opposite of the steps required to unlock the bracket assemblies 18. Bracket assembly 18 is placed upon support rail 16 when the actuating lever 44 is rotated to the completely open position illustrated in FIG. 5C.

Once the upper clamp portion 38 is placed upon the support rail 16, the bracket assembly 18 is locked into place through rotation of actuating lever 44 so that the actuating lever 44 sits within hollowed out portion 52, as seen in FIG. 5A. As seen in FIGS. 5A, 5B, and 5C, rotation of actuating lever 44 into the locked position causes flange 58 to rotate inward toward the neck 34 of the housing 36. As flange 58 rotates clockwise, the flange 58 rides out of the arcuate portion 75 of the locking clamp 42 and forces tab 74 down and away from inner surface 50 in a counterclockwise rotation movement. Rotation of tab 74 downwardly in turn causes clamp portion 70 to rotate upwardly toward upper clamp portion 38 to contact the support rail 16. As the actuating lever 44 is rotated to sit completely within hollowed out portion 52, the flange 58 passes over raised portion 76 and comes to rest on the tab 74. Once the flange 58 passes raised portion 76, the orientations of the pivot pins 64 and 82 and the contact between flange 58 and raised portion 76 prevents the locking clamp 42 from rotating back in the clockwise direction away from the support rail 16, thus locking the bracket assembly 18 to the support rail 16.

Thus, the present invention provides for a vehicle article carrier apparatus 10 having at least two bracket assemblies 18. The bracket assemblies 18 include a simplified locking mechanism having a minimal number of parts, thus making the locking mechanism easier and more efficient to manufacture. Further, the locking mechanism is able to open to such a degree that the bracket assemblies 18 may be vertically lifted from contact with support rails 16 without having to jostle or slide the bracket assemblies 18 from the support rails 16. Most importantly, the locking and unlocking motion of each bracket assembly is accomplished without the use of any separate springs or biasing elements. This significantly simplifies the consumption of the bracket assemblies 18 as well as reduce the cost of manufacture of these components. The reduced number of component parts of the bracket assemblies 18 further contributes to increased reliability of these components.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle article carrier apparatus adapted to be disposed on an outer body surface of a vehicle for supporting articles thereon, said apparatus comprising:

a pair of support rails adapted to be secured to said outer body surface in spaced apart relation to one another;

a cross bar having a length sufficient to substantially span a distance separating said support rails;

a pair of bracket assemblies secured to opposite ends of said cross bar, said bracket assemblies adapted to be coupled to each of said support rails to suspend said cross bar member between said support rails, each of said bracket assemblies including:

a housing;

an actuating lever pivotably coupled to said housing and pivotable between a closed position and an open position by manual movement by a user; and a locking clamp having a raised portion, said locking dame pivotably coupled to said housing between a locked position and an unlocked position relative to said support rail, said locking clamp securing said bracket assembly to said support rail when positioned in said closed position;

wherein a portion of said actuating lever obstructs pivotal movement of said locking clamp from said locked position to said unlocked position when said actuating lever is placed in said closed position and released by said user; and wherein said actuating lever passes over said raised portion when moved from said closed position to said open position.

2. The apparatus of claim 1, wherein said actuating lever interacts with said raised portion and is prevented from pivoting between said closed position and said open position due to said interaction with said raised portion.

3. The apparatus of claim 1, wherein said actuating lever moves said locking clamp from said locked position to said unlocked position as said actuator is moved from said closed position to said open position.

4. The apparatus of claim 1, wherein said bracket assembly may be vertically lifted from said support rail when said actuating lever is placed in said open position.

5. A vehicle article carrier apparatus adapted to be disposed on an outer body surface of a vehicle for supporting articles thereon, said apparatus comprising:

a pair of support rails adapted to be secured to said outer body surface in spaced apart relation to one another;

a cross bar member having a length sufficient to at least substantially span a distance between said support rails;

a pair of bracket assemblies secured to opposite ends of said cross bar member, said bracket assemblies being coupled to each of said support rails to suspend said cross bar member between said support rails, each of said bracket assemblies including:

a housing;

an actuating lever supported on said housing and having a graspable portion and a flange portion, said actuating lever being pivotally coupled to said housing and movable from a closed position to an open position;

a locking clamp pivotally supported on said housing adjacent said actuating lever, said locking clamp having a clamp portion and a tab portion having a raised portion;

said locking clamp movable between a locked position and an unlocked position;

said locking clamp engaging a respective one of said support rails when in said locked position to secure its associated said bracket assembly to said respective support rail;

wherein said flange of said actuating member contacts said tab portion of said locking clamp as said actuating lever is urged into said closed position, to thereby simultaneously urge said locking clamp into said locked position;

wherein said actuating lever passes over said raised portion when moved from said closed position to said open position;

wherein said graspable portion of said actuating member operates to maintain said actuating member in said closed position once said actuator is manually urged into said closed position and then released by a user; and wherein said locking clamp is pivotally supported such that said clamp portion thereof biases said tab portion into constant contact with said flange portion such that said locking clamp can be maintained in said locked position without the use of an independent biasing element, and wherein said clamp portion operates to urge said locking clamp from said locked position to said unlocked position as said actuating lever is moved from said closed position into said open position.

6. The apparatus of claim 5, wherein a pivot point of said actuating lever is laterally offset from a pivot point of said locking clamp such that movement of said locking clamp from said locked position to said unlocked position tends to further urge said actuating lever into said closed position.

7. The apparatus of claim 5, wherein rotational movement of said actuating lever in a first rotational direction from said closed position to said open position enables rotational movement of said locking clamp in a second direction opposite to said first direction of said actuating lever.

8. The apparatus of claim 5, wherein said housing operates to engage an upper surface of said respective support rail and said clamping portion of said locking clamp engages a lower surface of said respective support rail when said locking clamp is in said locked position.

9. The apparatus of claim 5, wherein said tab portion includes a raised portion for providing a tactile feel to said user when moving said actuating lever fully into said closed position.

10. A vehicle article carrier apparatus adapted to be disposed on an outer body surface of a vehicle for supporting articles thereon, said apparatus comprising:

a pair of support rails to be secured to said outer body surface in spaced apart relation to one another;

a cross bar having a length sufficient to substantially span a distance separating said support rails;

a pair of bracket assemblies secured to opposite ends of said cross bar, said bracket assemblies adapted to be coupled to each of said support rails to suspend said cross bar member between said support rails, each of said bracket assemblies including:

a housing;

an actuating lever pivotally coupled to said housing and pivotable between a closed position and an open position by manual movement by a user;

a locking clamp pivotably coupled to said housing between a locked position and an unlocked position relative to said support rail, said locking clamp securing said bracket to said support rail when positioned in said closed position, said locking clamp having a clamp portion and a tab portion and being movable between a locked position and an unlocked position;

a raised portion located upon said locking clamp;

wherein said actuating lever passes over said raised portion when moved from said closed position to said open position;

wherein a portion of said actuating lever obstructs pivotal movement of said locking clamp from said locked position to said unlocked position when said actuating lever is placed in said closed position and released by said user;

wherein said actuating lever interacts with said raised portion and is prevented from pivoting between said closed position and said open position due to said interaction with said raised portion;

wherein said locking clamp moves said locking clamp from said locked position to said unlocked position as said actuating lever is moved from said closed position to said open position; and wherein said bracket assembly may be vertically lifted from said support rail when said actuating lever is placed in said open position.

11. The apparatus of claim 10, wherein a pivot point of said actuating lever is laterally offset from a pivot point of said locking clamp such that movement of said locking clamp from said locked position to said unlocked position tends to further urge said actuating lever into said closed position.

12. The apparatus of claim 10, wherein rotational movement of said actuating lever in a first rotational direction from said closed position to said open position enables rotational movement of said locking clamp in a second direction opposite to said first direction of said actuating lever.

13. The apparatus of claim 10, wherein said housing operates to engage an upper surface of said respective support rail and said clamping portion of said locking clamp engages a lower surface of said respective support rail when said locking clamp is in said locked position.

14. The apparatus of claim 10, wherein said tab portion includes said raised portion for providing a tactile feel to said user when moving said actuating lever fully into said closed position.

15. A clamping assembly adapted to secure a first member to a second member, said clamping assembly comprising:

a housing adapted to be rigidly coupled to said first member;

an actuating lever pivotally coupled to said housing and pivotable between a closed position and an open position through manual movement by a user;

a locking clamp pivotably coupled to said housing between a locked position and an unlocked position relative to said second member, said locking clamp securing said clamping assembly to said second member when positioned in said locked position, said locking clamp having a clamp portion and a tab portion and being movable between a locked position and an unlocked position;

a raised portion located upon said locking clamp;

wherein said actuating lever passes over said raised portion when moved from said closed position to said open position;

wherein a portion of said actuating lever obstructs pivotal movement of said locking clamp from said locked position to said unlocked position when said actuating lever is placed in said closed position and released by said user;

wherein said actuating lever interacts with said raised portion and is prevented from pivoting between said closed position and said open position due to said interaction with said raised portion; and wherein said locking clamp moves from said locked position to said unlocked position as said actuating lever is moved from said closed position to said open position.

16. The clamping assembly of claim 15, wherein said first member is a vehicle article carrier cross bar and said second member is a vehicle article carrier support rail.

17. The clamping assembly of claim 15, wherein said clamping assembly may be vertically lifted from said second member when said actuating lever is placed in said open position.

18. The clamping assembly of claim 15, wherein a pivot point of said actuating lever is laterally offset from a pivot point of said locking clamp such that movement of said locking clamp from said locked position to said unlocked position tends to further urge said actuating lever into said closed position.

19. The clamping assembly of claim 15, wherein rotational movement of said actuating lever in a first rotational direction from said closed position to said open position enables rotational movement of said locking clamp in a second direction opposite to said first direction of said actuating lever.

20. A method for securing a vehicle article carrier cross bar to a pair of support rails secured to an outer body surface of a vehicle for supporting articles thereon, said method comprising:

placing a pair of bracket assemblies secured to opposite ends of said cross bar upon said support rails to suspend said cross bar between said support rails;

locking each of said bracket assemblies to said support rails by pivotably disposing an actuating lever of each of said bracket assemblies such that said actuating lever passes over a raised portion of a locking clamp tab to obstruct a locking clamp of each of said bracket assemblies from pivoting to an open position and prevents said bracket assemblies from being removed from said support rails; and unlocking each of said bracket assemblies to permit removal of each of said bracket assemblies from said support rails by pivotably disposing said actuating lever of each of said bracket assemblies such that said actuating lever permits said locking clamp of each of said bracket assemblies to pivot to an open position and permits release of said bracket assemblies from said support rails.

* * * * *